SURFACE SMOOTHNESS

×500 ↑
→ ×20

NOVEL PLYWOOD (SAMPLE 1): 1 COAT (10 lbs/1000ft²) OF NEO PHTHALIT

CONVENTIONAL PLYWOOD (SAMPLE 1): 1 COAT (11 lbs/1000ft²) OF NEO PHTHALIT

CONVENTIONAL PLYWOOD (SAMPLE 1): 2 COATS (20 lbs/1000ft²) OF NEO PHTHALIT

CONVENTIONAL PLYWOOD (SAMPLE 1): 3 COATS (31 lbs/1000ft²) OF NEO PHTHALIT

CONVENTIONAL PLYWOOD (SAMPLE 1): 4 COATS (40 lbs/1000ft²) OF NEO PHTHALIT

SURFACE SMOOTHNESS

↑ x500
→ x20

NOVEL PLYWOOD (SAMPLE 2): 1 COAT (15 lbs/1000ft²) OF NEO PHTHALIT

CONVENTIONAL PLYWOOD (SAMPLE 2): 1 COAT (17 lbs/1000ft²) OF NEO PHTHALIT

CONVENTIONAL PLYWOOD (SAMPLE 2): 2 COATS (32 lbs/1000ft²) OF NEO PHTHALIT

CONVENTIONAL PLYWOOD (SAMPLE 2): 3 COATS (48 lbs/1000ft²) OF NEO PHTHALIT

INVENTOR.
KINGO URATA
BY Jesse D. Reingold
ATTORNEY

United States Patent Office 3,560,242
Patented Feb. 2, 1971

3,560,242
PROCESS FOR THE PREPARATION OF SURFACED LAUAN PLYWOODS FOR DOORS, READY FOR PAINT
Kingo Urata, Fujikawa-machi, Shizuoka-ken, Japan, assignor to Noda Plywood Mfg. Co., Ltd., Shizuoka-ken, Japan
Filed Dec. 8, 1967, Ser. No. 689,092
Claims priority, application Japan, Oct. 6, 1967, 42/64,070
Int. Cl. B44d 1/14, 1/28
U.S. Cl. 117—57
2 Claims

ABSTRACT OF THE DISCLOSURE

A process for the preparation of surfaced lauan plywoods ready for paint, which are useful as door panel material, characterized by sanding the surface of plywoods to be treated; coating a treating agent on the sanded surface, pressure contacting the coated surface with a reverse coater roller rotating at a specific reverse peripheral velocity with respect to the mating feed roller and heating the plywood so treated to a specific temperature to harden the agent in order to obtain a more smooth, leveled surface; and then repeating twice more a serial operations consisting of such coating, pressure contacting and heating as above each under specific conditions in order to obtain a substantially perfectly smooth, leveled surface ready for paint finish.

---

This invention relates to a process for the preparation of surfaced lauan plywoods useful as door panel material for flush doors, the plywood surface being readily finished with paint, and to the surfaced lauan plywoods prepared thereby.

Lauan plywoods which have hitherto been used as door panel material for flush doors are not such that their surface is so treated as to be ready for paint finish. A flush door has conventionally been made from lauan plywoods and core material by applying an adhesive onto either the reverse untreated side of the plywoods or the sides of the core material, placing the core material between the plywoods with their reverse side facing the core material and then pressing them together to effect to bond therebetween.

It is a common practice that the flush door so conventionally fabricated is installed in place at the doorway and then finished with a paint as desired. In effecting this paint finish, there will be found difficulties that a uniform color tone of the door surfaces is not obtained after the painting because of tremendous absorption of the finishing paint into the face veneers of the lauan plywoods of the components of the door due to many fine voids and cracks present on or near the surface of the veneers and that a uniform, smooth coat of the finishing paint is not readily formed because the veneers have a porosity of 50-70% and therefore their surface is rough.

A finishing paint coat having a rough surface looks less light and is different in tone of color than one having a smooth surface even if they are those which are formed under the same conditions. To allow paint coats having a uniform color tone and surface smoothness to be formed on the conventional lauan plywoods, the paint must be repeatedly coated on the plywoods with the result that the coats formed are considerably thick.

On the other hand, lauan plywoods previously finished with paint have never been used as a component for a flush door because of possible serious damages done to the paint coat by the pressure applied and other operations to fabricate the door.

It has now been found that the above disadvantages can be eliminated in conventional lauan plywoods by sanding untreated plywoods to the extent that the surface thereof may come to be substantially identical in color tone and smoothness and then coating the surface with a filling agent in such a manner that not only the fine cracks and pores present on the surface are filled with a treating agent, but also the whole area of the surface is covered with a filmy coat of the agent. This is the discovery on which this invention is based.

It is an object of this invention to provide a process for the preparation of surfaced lauan plywoods, which are readily finished with paint, for flush doors as the components thereof.

It is another object of this invention to provide a novel lauan plywood the surface of which is so treated that it may be readily coated with a finishing paint.

Other objects and advantages of this invention will be apparent from the following description.

This invention will be hereunder explained with reference to the three figures.

Figure 1:
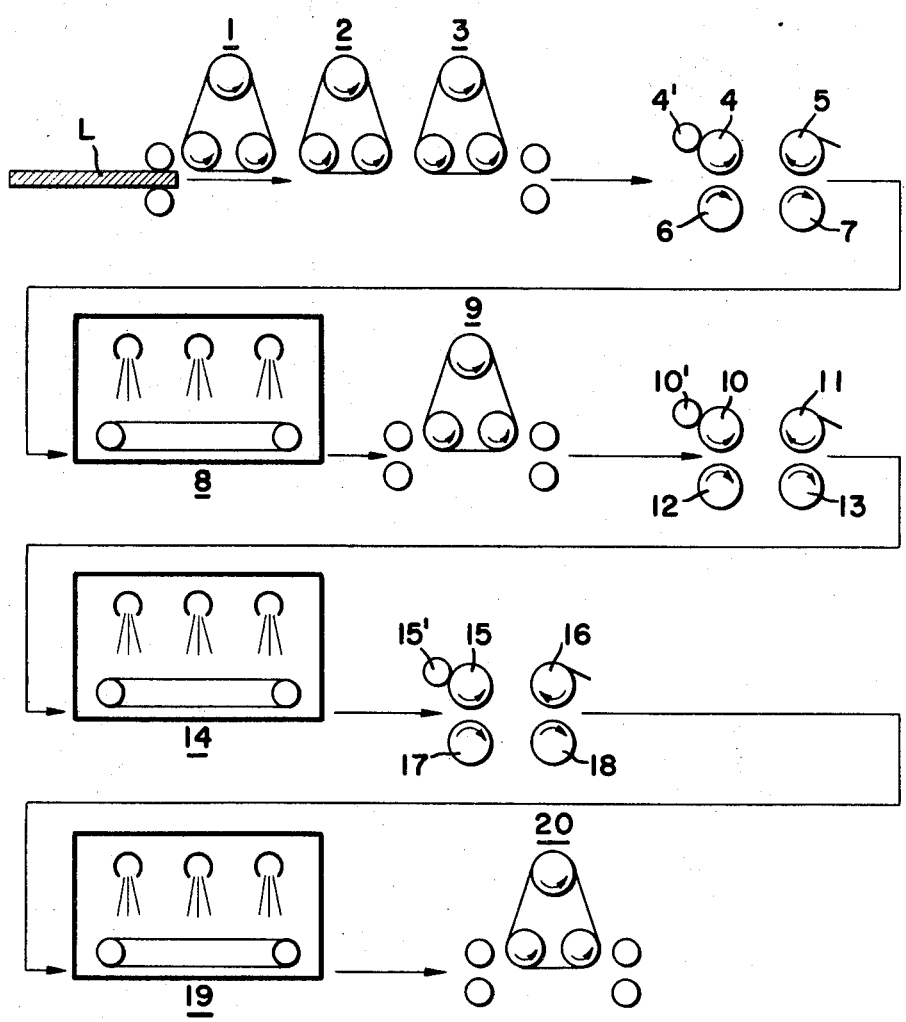
FIG. 1 is a flow-sheet showing a preferred practice of this invention.

Now referring to FIG. 1, a lauan plywood L for a door panel material is passed in the direction indicated by the arrow through under a wide belt sander system consisting of three abrasive-bearing belts 1, 2 and 3 which are each rotatably supported around three contact rolls to form a sanding drum. The wide belt sander may be substituted by a drum sander or stroke sander. During its passage under the sander system, the plywood is abraded at its surface by the belt sanders 1, 2 and 3 in this order to remove fuzzy wood fibers of the plywood surface therefrom for the subsequent operation. In the above-mentioned sanding operation, it is the most preferable that the surface of the plywood is firstly sanded somewhat coarsely with the sanding drum 1 having a fine abrasive of particle size 2/0–100—4/10–150, secondly sanded finely with the drum 2 having a very fine abrasive of particle size 3/0–120—5/0–180 and finally polished with the drum 3 having an extra fine abrasive of particle size 5/0–180—9/0–320 to smoothen the surface for the subsequent priming operation. Depending upon the degree of roughness and the condition of fuzzy wood fiber raised up of a wood surface to be treated, either the drum 1 or the drum 2 may be omitted.

The lauan plywood so sanded is substantially free of the fuzz rising up, and this permits not only the voids present in the surface portion of the sanded plywood to be readily filled with a filling agent, but also the agent to form a uniform film all over the surface in the subsequent priming operation.

The plywood sanded is then passed through between an applicator roller 4 and feed roller 6 and then between a reverse coater roller 5 and feed roller 7 of a first reverse coater system, where a filling agent is uniformly applied by the applicator roller to the surface of the plywood under such a condition that the amount of the agent applied to the surface is controlled by a metering doctor roller 4' and then it is formed into a uniform filmy coat on the surface by forcing it, in part, into the voids and fine cracks present in the surface portion simultaneously with removing the excess of it from the surface by use the reverse coater roller. In the conventional operation of filling the voids of a wood surface with a filler, the filling is so effected that the voids of the wood surface are filled up with the filler and the filler applied to the surface parts other than the openings of the voids is subsequently removed by sanding, while in the corresponding operation of this invention the voids of a wood surface are filled up with a filler in the same way as above and simultaneously the filler applied to the surface parts other than the openings of the voids is not entirely removed from the surface but left thereon in an amount desired in order that a filmy coat of the filler, covering the whole surface, may be formed. Referring again to the FIG. 1, the formation of a filmy coat desired of the treating agent is accomplished by regulating the clearance between the surface of the plywood and that of the reverse coater roller 5 as well as the ratio between the circumferential velocity of the reverse coater roller 5 and that of the feed roller 7 while passing the plywood through the reverse coater system. Part of the filling agent which has been forced into the voids and other cracks of the surface portion of the plywood as well as the greater part of those which has formed the filmy coat and with which the plywood surface portion has been impregnated, are hardened by evaporating the solvent contained in the agent therefrom or by curing the agent (if it is a thermosetting agent) due to the heat caused by the friction between the surface of the moving plywood and that of the rotating reverse coater roller 5. This roller 5 is water-cooled by passing the water through inside it to avoid being overheated, thereby to prevent the excess agent removed from the plywood surface from hardening on the surface of the roller 5. The plywood is then passed through a drying oven 8 in which hot air is circulated, where is almost completely hardened all of the agent remaining on the plywood surface, in the form of the filler in the voids, the filmy coat, etc. The plywood from the oven is transferred to a wide belt sander 9 having a super fine abrasive of particle size 10/0–400, where it is slightly sanded to remove nibs still remaining on the plywood surface therefrom. If the size and number of nibs have been substantially reduced, the sanding treatment by the sander 9 is not necessary. The plywood is then sent to a second reverse coater system where an additional filling agent of the same kind is applied to the surface of the plywood by an applicator roll 10 in such an amount as is adjusted by a doctor roll 10' and the plywood thus treated is then inserted to between a reverse coater roller 11 and feed roller 13 in order to forcibly fill with the fresh agent the recesses still remaining on the surface previously treated by the first reverse coater system while removing the excess of the fresh agent from the surface to form another uniform film of the agent thereon. Both the degree of the filling of the recesses of the voids with the additional agent and the thickness of a film to be formed can be adjusted by varying the ratio between the circumferential velocity of the reverse coater roller 11 and that of the feed roller 13. The plywood from this coater system is passed to a second drying oven 14 in which hot air is circulated, in order to harden all of the additional agent remaining on the surface portion of the plywood. The hot air-circulating drying oven may be substituted by an infrared lamp oven or a direct gas infrared oven. The plywood from the oven 14 is finally transferred to a third reverse coater system where it is coated on the surface with a further additional agent of the same kind during the passage between a feed roller 17 and applicator roll 15, followed by forcibly filling with this newly applied agent very smaller and fewer recesses still further remaining on the surface portion while forming a third uniform film of the agent all over the second film previously formed. The plywood from the third coater system is then passed through a third drying oven 19 of the same kind as above to complete the hardening of the agent remaining on the surface portion of the plywood and, if necessary, it will be subjected to a suitable polishing treatment depending upon the status of its surface hitherto treated. There is thus obtained an excellent, surfaced lauan plywood useful as a door panel material for a flush door, the treated surface of the plywood being readily finished with paint if desired.

Treating agents which may be employed in the application by the reverse coater systems include an emulsion type, lacquer type, aminoalkyd type and the like as well as conventional fillers for wood. Such agents include melamine-formaldehyde resins, urea-formaldehyde resins, heat-convertible alkyd resins, acrylic resins and mitrocellulose lacquer.

Three reverse coater systems should be employed in series on the processing line of this invention to give the best result from the viewpoint of economy and quality of the products.

The functions of the three reverse coater systems used in the practice of this invention are as follows:

The function of the first reverse coater system is mainly to force a filling agent into the voids and other cracks on the surface portion of a plywood to be treated, and therefore the ratio between the peripheral velocity of the reverse coater roller and that of the mating roller should preferably be in the range of about 1/2–3/5; the function of the second one is mainly to improve the filling by additionally forcing such agent into the voids and cracks still remaining incompletely filled or empty while forming a more uniform film on the surface of the less uniform film previously formed by the first coater system, and the peripheral velocity ratio should therefore be in the range of about 3/5–1/1; and the function of the third one is mainly to form the most uniform film on the second film formed by the second system, and the velocity ratio should therefore be in the range of about 1–2.

Because of the presence of the threefold uniform film formed on its surface which has been made leveled by filling the voids and cracks with the filling agent, the lauan plywood treated in accordance with this invention permits a uniform absorption of a paint used into every part of the face veneer of the plywood thereby to eliminate the difference in color tone of finished surface between any two of the parts of the single plywood or between any two of such plywoods. Because of the thinness of the film formed on its surface, the lauan plywood as mentioned above will be finished with a paint substantially without showing any sign of a damage after the completion of the operation for fabricating a door in which the plywood is to be used as its component, even if it suffers the damage which is not so slight.

The filling agent preferably used in the practice of this invention is one which has the lightness of 18–20 (V7.1/ 9.6/ by Munsell notation). The term "filling agent" as used herein encompasses a film forming resin and a body pigment which accounts for 50–80% of the gross weight.

In addition, the plywood may optionally be finished with any paint because it has the treated surface of a uniform lightness, predetermined at V18–20 by Munsell notation.

This invention will be better understood by the following examples.

EXAMPLE 1

A 1/8" thick lauan plywood, the face veneer of which was prepared from a mottled lauan sapwood, to be surfaced for use as a door panel material was treated by sanding the face veneer with a wide belt sander system consisting of three sanding drums having an abrasive of particle size of 4/0–150, 5/0–180 and 7/0–240, respectively. The plywood so sanded was then passed through the first reverse coater system where a white emulsion type filling agent (an acrylic resin emulsion (acrylic resins 46%, water 54%) such as acrylic emulsion "Rhoplex" (Rohm & Hass) 37%, a defoamer such as propylene glycol ("Nopco") 0.2%, a dispersant such as sodium polyelectrolyte carboxylate ("Tamol") 0.2%, a wetting agent such as alkylaryl polyether alcohol ("Triton") 0.2%, titanium dioxide 6.4%, and clay 46% and talc 10%) was applied in a little excess to the sanded surface of the plywood by the applicator roller and then the agent applied was partly forced into the voids while it was partly formed into a film covering the whole area of the surface of the plywood during its passage between the water-rolled reverse coater roller and the corresponding or mating feed roller under the condition that the ratio between the peripheral velocity of the reverse coater roller and that of the mating feed roller was 1/2. The plywood so treated was dried in the hot air at a temperature of 80° C. for 20 seconds, after which the dried plywood was sanded to remove nibs present on its surface therefrom by use of a wide belt sander in which an abrasive of particle size 7/0–240 was used.

The plywood from the first coater system was passed to the second reverse coater system where an additional filling agent of the same kind as used in the first coater system was applied to the plywood surface and forcibly rubbed thereinto under the squeezing pressure exerted by the second reverse coater roller rotating at 3/5 times the circumferential velocity of the mating feed roller, and thereafter passed to the oven where it was heated in the hot air at 90° C. for 10 seconds to dry or cure and consequently harden a second coat formed thereon. The plywood was then passed through the third reverse coater system, where a further additional filling agent as the same kind as above was applied to and pressed against the plywood surface by the third reverse coater roller rotating at 3/2 times the peripheral velocity of the mating feed roller, to the drying oven in which a third film finally formed on the plywood surface was dried or cured. In this example, the feeding rate of the plywood to be treated was 100 m./min. There were thus obtained lauan plywoods which were useful as door panel materials and whose surfaces were prepared for easy paint finishing, with smoothness and lightness of 19 (V8.2/ by Munsell notation).

Figure 2:
FIGS. 2 and 3 show the comparison of surface smoothness between the novel and the conventional plywood each finished with a certain phthalic paint.
Figure 2:
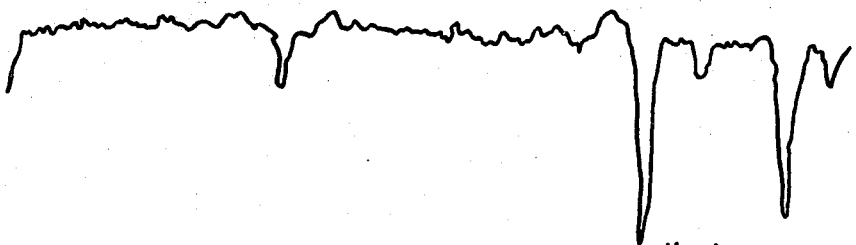
Figure 2:
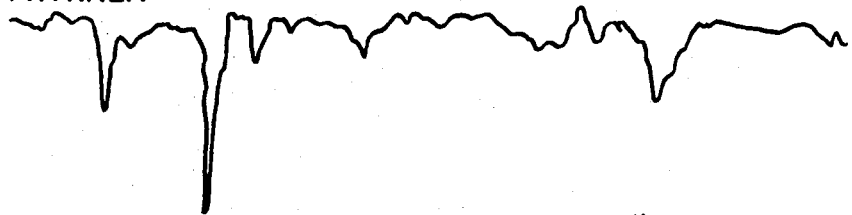
Figure 2:
Figure 2:
Figure 3:
Figure 3:
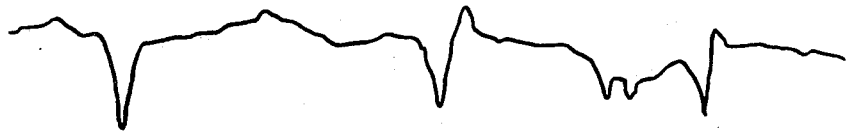
Figure 3:

For comparative tests, these novel, surfaced plywoods and conventional ones were finished with an alkyd resin such as phthalic paint sold under the tradename of "Neo Phthalit" by the Kansai Paint Co., Japan. The comparative tests were made on the two kinds of painted plywoods for their gloss (60° specular gloss) and surface smoothness by use of gloss meter GM–3 made by Murakami Color Research Laboratory and Yamamoto's Surface Smoothness Tester, respectively. The tests for surface smoothness were so conducted over the distance of 7.5 mm. that the results from the tests might be represented by oscillograms longitudinally five hundred times and laterally twenty times each magnified. The method of testing the surface smoothness was a printing one and therefore it was developed to obtain the oscillograms for surface smoothness. The results obtained from the comparative tests are shown in Table 1 and FIGS. 2 and 3.

TABLE 1

| Test No.: | Specular gloss | | | | |
| --- | --- | --- | --- | --- | --- |
| | Novel plywood, Sample 1, 1 coat[1] | Conventional plywood, sample 1 | | | |
| | | 1 coat[2] | 2 coats[3] | 3 coats[4] | 4 coats[5] |
| 1 | 67.7 | 2.4 | 16.6 | 38.2 | 34.8 |
| 2 | 66.8 | 3.0 | 20.7 | 40.7 | 32.0 |
| 3 | 81.0 | 4.1 | 26.6 | 58.6 | 61.3 |
| 4 | 78.6 | 4.1 | 41.3 | 62.8 | 57.3 |
| Average | 73.5 | 3.4 | 26.3 | 50.1 | 46.4 |

[1] 10 lbs./1,000 ft.² of Neo Phthalit.
[2] 11 lbs./1,000 ft.² of Neo Phthalit.
[3] 20 lbs./1,000 ft.² of Neo Phthalit.
[4] 31 lbs./1,000 ft.² of Neo Phthalit.
[5] 40 lbs./1,000 ft.² of Neo Phthalit.

EXAMPLE 2

A lauan plywood to be treated was passed at a feeding rate of 100 m./min. to the sanding system where the surface of the plywood was roughly sanded by a drum sander having an abrasive of particle size 3/0–120, then mildly sanded by a drum sander having an abrasive of particle size 4/0–150 and finally minutely sanded by a drum sander having an abrasive of particle size 70/–240 to obtain a substantially even surface. The plywood from the sanding system was passed to the first reverse coater system where its sanded surface was coated with a coloring, treating agent of lacquer type (the agent being, in color, 3.3Y8.5/2.4 by Munsell notation and consisting of lacquer varnish 28%, talc 25% and silica 40%, and coloring pigment 5%) by the applicator roller and then pressure contacted with the water-cooled reverse coater roller rotating at half the peripheral velocity of the mating feed roller, and then passed to the first drying oven to subject the agent on the plywood surface to ten seconds' drying in the hot air at 90° C. The plywood from this oven was passed through the second reverse coater system (the peripheral velocity ratio: 4/5) and the second drying oven and further through the third reverse coater system (the peripheral velocity ratio: 1/1) and the third drying oven to a finishing wide belt sander having an abrasive of particle size 9/0–320 to make the coated surface still evener, the second and third coating and drying conditions being respectively the same as in the first coater system and drying oven except for the peripheral velocity ratios. There were thus obtained the plywoods desired the treated surfaces of which were uniformly creamy in color.

Comparative tests were made on the plywood obtained in this example and a conventional one after both of them had been finished with a phthalic paint "Neo Phthalit" to determine their gloss and surface smoothness, and the results obtained from the tests were found to be approximately the same as in Example 1.

EXAMPLE 3

A kapul (a kind of lauan) plywood to be treated was transferred at a feeding rate of 100 m./min. to the wide belt sander system where the plywood was successively sanded by the three kinds of sanders having abrasives of particle size 4/0–150, 5/0–180 and 9/0–320, respectively. The plywood so sanded was then passed to the first reverse coater system to apply a transparent treating agent of aminoalkyd type (the agent being composed of amino resin varnish 40%, phthalic resin varnish 52%, and a curing agent 8% consisting of hydrochloric acid 7%, p-toluenesulfonic acid 40%, methyl alcohol 50% and i-propyl alcohol 3%) to the plywood surface sanded and press the applied agent against the surface under the pressure exerted by the reverse coater roller rotating at 3/5 times the peripheral velocity of the mating feed roller (the velocity ratio of 3/5 being selected in this case because of the lower porosity of kapul than that of lauan), and further passed to the first drying oven to subject the agent still remaining on the surface to ten minutes' drying in the hot air at 80° C., followed by gently sanding the dried, coated surface by use of a finishing wide belt sander having abrasive grains of grain size 10/0–400. The plywood from this wide belt sander was then treated in the second and third reverse coater system and drying oven in the same way as in the first reverse coater system and drying oven except that a white treating agent of aminoalkyd type (amino resin varnish 20%, phthalic resin varnish 45%, titanium dioxide 10%, barium sulfate 20%, and curing agent 5% consisting of hydrochloric acid 7%, p-toluenesulfonic acid 40%, methyl alcohol 50% and i-propyl alcohol 3%) was employed as a treating agent and the circumferential velocity ratio in the second and the third coater system were respectively 4/5 and 1/1. There was thus obtained a plywood the surface of which was prepared for easy paint finish.

What is claimed is:

1. A process for the production of surfaced lauan plywood ready for paint, comprising the steps of sanding the surface of the lauan plywood to be treated by use of first sanders to remove from the surface substantially all fuzzy wood fibers present thereon; applying a filling-coating agent which comprises a major amount of pigments and a minor amount of vehicle of acrylic resin emulsion, lacquer varnish or amino resin alkyd varnish to the sanded surface by a first applicator roller, advancing the plywood underneath a reverse coater roller and above a mating first feed roller, rotating said first reverse coater roller at a peripheral speed different from that of said mating first feed roller, pressure contacting said advancing plywood with said first coater rollers to fill in the voids and cracks of the plywood surface with said filling agent and to impregnate the remaining flat portions thereof with said agent, at the same time removing any excess of said agent from the surface to form a thin film of the agent over the entire surface of the plywood, hardening at least some of the agent with heat generated by the friction between the surface and said first reverse coater roller to form a partially hardened film on said plywood, heating the plywood to dry all of the agent remaining on the surface thereof and removing nibs still left on the dried or cured surface therefrom by an additional sanding, applying an additional filling-coating agent of the same kind to the plywood surface by a second applicator roller, advancing the plywood underneath a second reverse coater roller and above a mating second feed roller, rotating said second reverse coater roller at a peripheral speed different from that of said mating second feed roller, pressure contacting said advancing plywood with said second coater rollers and removing excess agent as aforesaid to form a second thin film and heating the plywood thus treated to dry all of the additional agent remaining on the surface; applying a further addition filling-coating agent to the plywood surface by a third applicator roller, advancing the plywood underneath a third reverse coater roller and above a mating third feed roller, rotating said third reverse coater roller at a peripheral speed different from that of said mating third feed roller, pressure contacting said advancing plywood with said third coater rollers and removing excess agent as aforesaid to form a third thin film and heating the plywood hitherto treated to dry all of the further additional agent remaining on the plywood surface; wherein the peripheral velocity ratio of the first reverse coater roller to its mating feed roller, that of the second coater roller to its mating feed roller and that of the third coater roller to its mating feed roller is about ½–⅗, ⅗–1 and 1–2, thereby to produce a lauan plywood having a surface which is substantially leveled and uniformly coated ready for paint and printing.

2. A process according to claim 1 wherein the filling-coating agent has a controlled lightness of 18–20 determined at V7.1/–9.6/ by Munsell notation.

References Cited

UNITED STATES PATENTS

| | | | |
|---|---|---|---|
| 3,271,187 | 9/1966 | Chen et al. | 117—111 |
| 2,339,511 | 1/1944 | Partee | 117—57 |
| 2,772,986 | 12/1956 | Buck | 117—72 |
| 2,827,935 | 3/1958 | Alexander | 117—57X |
| 3,070,458 | 12/1962 | Berry | 117—148X |
| 3,090,695 | 5/1963 | Orth | 117—148X |
| 3,125,461 | 3/1964 | Hoffmann | 117—148X |
| 3,180,753 | 4/1965 | Fritsch | 117—148X |
| 3,219,473 | 11/1965 | Dimond | 117—57X |

WILLIAM D. MARTIN, Primary Examiner

W. K. TRENOR, Assistant Examiner

U.S. Cl. X.R.

117—72, 111, 148